United States Patent [19]

Means et al.

[11] 4,186,576
[45] Feb. 5, 1980

[54] VEHICLE LOCKING DEVICE

[76] Inventors: Howard W. Means, 5777 NE. Cascade, West Linn, Oreg. 97068; Edward Allick, 812 6th St., Oregon City, Oreg. 97045

[21] Appl. No.: 887,181

[22] Filed: Mar. 16, 1978

[51] Int. Cl.² .............................................. E05B 71/00
[52] U.S. Cl. ..................................................... 70/233
[58] Field of Search ................ 70/58, 57, 18, 14, 233, 70/234, 15

[56] References Cited

U.S. PATENT DOCUMENTS

| | | | |
|---|---|---|---|
| 3,335,585 | 8/1967 | Stratton | 70/58 |
| 3,354,675 | 11/1967 | Quigg | 70/58 |
| 4,023,387 | 5/1977 | Gould | 70/233 |
| 4,024,741 | 5/1973 | Arblaster | 70/233 |

*Primary Examiner*—Robert L. Wolfe
*Attorney, Agent, or Firm*—Kolisch, Hartwell, Dickinson & Stuart

[57] ABSTRACT

A locking device for securing a vehicle to an object. The device includes an insert which is detachably mounted on the vehicle in a position sealing off a chamber provided on the vehicle. The device further includes an elongate cable adapted to be stowed within such chamber with the locking device not in use. The cable may be removed from the chamber with removal of the insert, and on being passed around the object used to anchor the vehicle. The insert is used to fasten the cable to the vehicle.

6 Claims, 7 Drawing Figures

U.S. Patent    Feb. 5, 1980    4,186,576
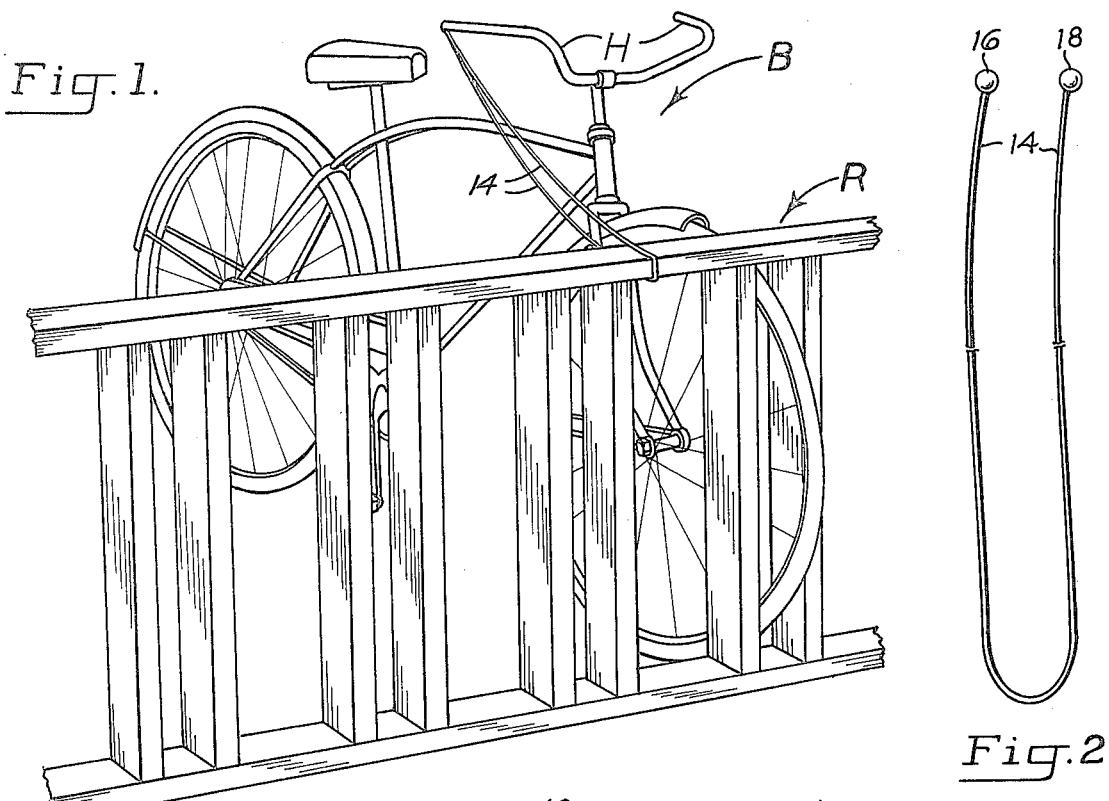
Fig.1.
Fig.2.
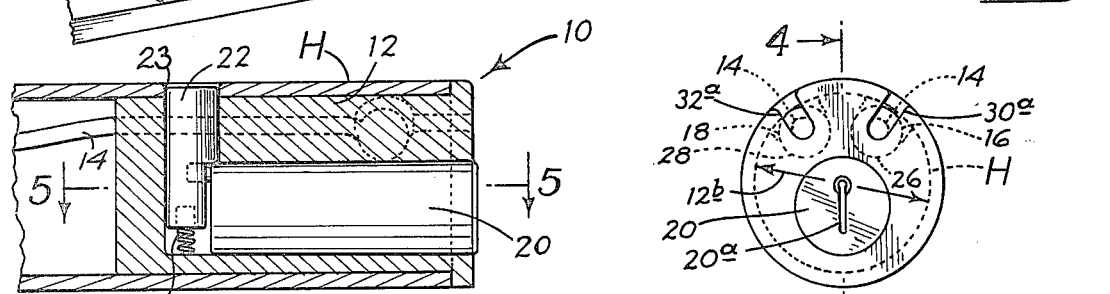
Fig.4.    Fig.3.
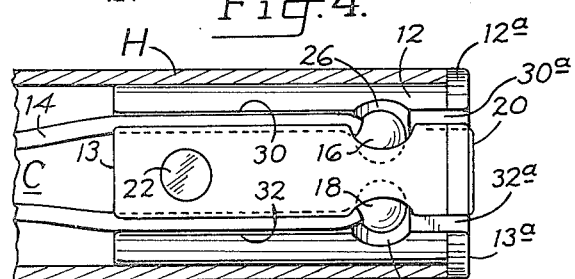
Fig.5.
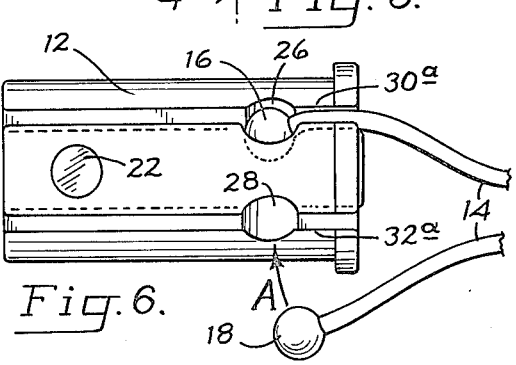
Fig.6.
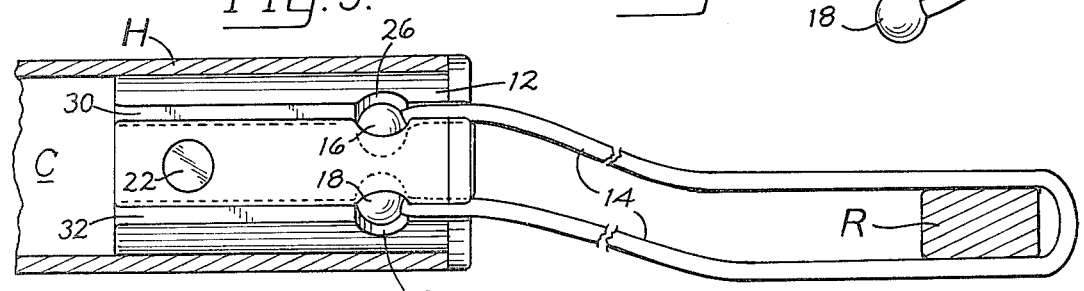
Fig.7.

VEHICLE LOCKING DEVICE

BACKGROUND AND SUMMARY OF THE INVENTION

The present invention relates to vehicle locking devices, and more particularly to a locking device of the so-called cable type, which includes a cable that is stored on the vehicle with the device not in use locking the vehicle.

Various types of cable locking devices have been proposed for use with vehicles such as bicycles. These locking devices usually include a combination lock of some type, which is used to connect two ends of a cable together after the cable has been passed around a portion of the bicycle and a stationary object. Using such a cable locking device, the bicycle may be secured to a tree, post, bicycle rack, etc. Such cable locking devices find particular utility when it is desired to leave a bicycle unattended in an area where there are no bicycyle racks. The cable in such locking devices comprises chain, steel cable or other cable material which is not readily severed.

The cable in such locking devices generally is stowed on the bicycle in some fashion when not in use to secure the bicycle to an object. If the cable is relatively long, such commonly is wrapped around a frame member of the bicycle, in a manner whereby it will not become inadvertently loosened during travel. Generally, the cable is wound around a tubular member such as the seat upright, or other frame member in the bicycle, and the ends of the cable are locked together after the length of cable has been so wound. While the cable may be stowed on the bicycle in such manner, it is apparent that there are several distinct disadvantages in such a stowage method. For instance, during travel of the bicycle, the cable may rattle on the frame member, and cause scratching and other damage. The cable is unsightly, and furthermore can be dangerous, should it, for example, accidentally loosen and become encumbered with the spokes of the bicycle.

Various carrier mechanisms have been proposed for stowing a cable on a bicycle with the cable not in use for locking purposes. Such carrier mechanisms add unnecessary weight, frequently detract from the appearance of the bicycle, and frequently take up space which could be better used for other purposes.

A general object of the invention is to provide a vehicle locking device, including a cable employed to anchor the vehicle to an object, where the cable is stored within a chamber on the vehicle when not in use.

The usual bicycle includes a handlebar made of tubular material as well as other components of the frame which are likewise made of tubular material. A further feature and object of the invention is the provision of a locking device including a cable, wherein the chamber which is employed to store the cable during nonuse periods comprises the hollow interior of a tubular component present in the bicycle, such as the handlebar of the bicycle.

A further object of the invention is to provide a locking device for a bicycle or similar vehicle which features what is referred to herein as a "detachable insert" adapted to be mounted within the hollow end of a bicycle handlebar to close it off. With a cable stowed in the handlebar, the insert blocks access to the cable and thus prevents tampering with it.

Yet a further object of the invention is to provide such a locking device featuring an insert as above described, where the insert is additionally used to secure the ends of a cable together and to secure such ends in turn to the bicycle handlebar with the cable wrapped around an object and functioning to secure the bicycle from theft.

These and other objects and attendant advantages of the present invention will become apparent as further consideration is given to the following detailed description and accompanying drawings.

BRIEF DESCRIPTION OF THE DRAWINGS

A preferred embodiment is illustrated in the drawings, where:

FIG. 1 is a perspective view showing a bicycle locked to a bicycle rack by means of the cable locking device of the present invention;

FIG. 2 is a view of an elongate cable forming part of the locking device;

FIG. 3 is an end view of a detachable lock insert, also forming part of the locking device, mounted within the end of a handlebar in the bicycle;

FIG. 4 is a cross-sectional view, taken along line 4—4 of FIG. 3;

FIG. 5 is a view taken along line 5—5 of FIG. 4;

FIG. 6 is a view of the insert removed from the handlebar and illustrating repositioning of the cable relative to the insert; and FIG. 7 is a view illustrating the insert mounted within the end of a handlebar with the cable extending outwardly from the insert as such would be positioned when locking the bicycle to an object.

DETAILED DESCRIPTION OF THE INVENTION

Turning now to the drawings, and referring initially to FIGS. 1-4, the locking device of the present invention is generally designated at 10. Locking device 10 includes a lock insert or insert means, and an elongate cable 14.

Referring to FIG. 2, it can be seen that cable 14 includes enlarged end portions or protuberances 16, 18. The cable is constructed of a steel alloy which may not be readily severed. Preferably, the cable is a wire strand type, rather than a chain link type, as such facilitates pushing of the cable into a chamber when preparing to store the cable.

Insert means 12 is adapted to be mounted within a chamber opening defined on the bicycle. In the specific embodiment of the invention shown, and as illustrated at FIGS. 3 and 4, this chamber opening is the open end of the tubular handlebar ordinarily found in a bicycle. When mounted as shown in FIGS. 3 and 4 in the open end of the handlebar, the insert seals or closes off the handlebar end, forming a closed chamber inside that part of the handlebar which extends inwardly from the insert.

Insert means 12 has generally a cylindrical shape, and includes a key locking cylinder 20 which is actuatable to extend or to retract a locking pin 22. The spring 24 biases the locking pin upwardly in FIG. 4. Upon insertion of a key into the keyway 20a of the locking cylinder, locking pin 22 may be selectively retracted or extended to move the pin out of or into an aperture 23 provided in the handlebar.

With reference to FIG. 5, specific features of the detachably mounted insert will be particularly described. The insert includes an end flange or extended peripheral rim 12a dimensioned to prevent it from being totally inserted within the handlebar H. Two cavities 26, 28 are formed in the sides of the insert, which are sized to receive protuberances 16, 18 of cable 14. Extending longitudinally of the insert are elongate grooves 30, 32 which extend from associated cavities 26, 28 respectively to an interior end 13. Shorter grooves 30a, 32a extend from associated cavites 26, 28, respectively to an outside end 13a of insert 12.

Locking device 10 is shown in FIGS. 3-5 in a stowed condition. In this condition, cable 14 extends inwardly within the handlebar from the insert. End portions of the cable adjacent protuberances 16, 18 seat in grooves 30, 32. Protuberances 16, 18 seat within associated cavities 26, 28 respectively. The cable forms a large loop within the handlebar (not illustrated by reason of the cable having been broken away in the figures).

When it is desired to remove cable 14 from its stowed position, for the purpose of using the cable in the locking of the vehicle or bicycle, an appropriate key is inserted within keyway 20a, and locking cylinder 20 actuated so as to retract lock pin 22 from aperture 23. Insert 12 may then be slidably removed from the end of the handlebar, with withdrawing of cable 14 from chamber C defined within the handlebar.

As shown in FIG. 6, with the insert so removed, the cable may be lifted from grooves 30, 32 and shifted to a position where the loop of cable which formerly extended inwardly on the insert now extends outwardly on the insert. With removal of one of the protuberances 16, 18, from the cavity receiving it, an end of the cable is free from the insert. This permits the cable to be passed about an object, such as the support member shown in bicycle rack R. After having been passed around this object, the free cable end is reseated on the insert by returning the protuberance on this free end back to the cavity from which such formerly was removed. This is illustrated in FIG. 6 wherein protuberance 18 may be returned to cavity 28 by moving such upwardly in the direction indicated by arrow A.

FIG. 7 illustrates the insert returned to the opening at the end of the handlebar, the insert now having the cable extending outwardly therefrom and looped around the object to which the bicycle is anchored. In this condition, portions of the cable adjacent the ends seat within grooves 32a, 30a.

On being returned to the opening at the end of the hollow handlebar, the locking cylinder may be actuated to extend pin 22 whereby such moves into aperture 23 to lock the insert in place.

A modification of the present invention includes configuring one of the cavities so that the protuberance associated therewith is nonremovably yet rotatably disposed therewithin. For instance, considering FIG. 6, protuberance 16 may be nonremovably disposed within cavity 26, yet may be rotated within such cavity for the purpose of swinging the looped cable from the position of FIG. 4 to the position of FIG. 6. Of course, at least one of the protuberances, such as the protuberance 18 shown in FIG. 6, must be releasable from its associated cavity, so that the cable may be passed around an object to which the vehicle is to be secured.

There are several distinct advantages inherent in the present invention. For instance, it is readily apparent that insert means 12 permits cable 14 to be quickly and efficiently stowed in a chamber having an opening. Specifically, handlebar H provides such a chamber and opening, but it is to be remembered that other frame members having such a chamber and opening sufficient in size to stow the cable could be used. With cable 14 stowed in the handlebar H, the cable is contained out of the way of a rider and is essentially tamper-proof. Additionally, the cable will not damage paint or other structure of the bicycle. Also, it is clear that the cable is stowed safely.

While the invention has been particularly shown and described with reference to the foregoing preferred embodiment, it will be understood by those skilled in the art that other changes in form and detail may be made therein without departing from the spirit and scope of the invention as defined in the appended claims.

It is claimed and desired to secure by Letters Patent:

1. A locking device for securing a vehicle to an object comprising:
    an elongate cable with enlarged end portions;
    insert means adapted to be detachably mounted within a chamber opening defined on the vehicle;
    said insert means including locking means for selectively locking said insert means in said opening;
    said insert means having receiving means provided thereon for receiving and holding said enlarged end portions of said cable, with at least one of said end portions being separable from said insert means.

2. The locking device of claim 1, wherein said receiving means includes at least one cavity for receiving said enlarged end portions, said receiving means also including groove means for holding a portion of a length of said cable.

3. The locking device of claim 1, wherein said receiving means is arranged to receive said enlarged end portions with said end portions not extending beyond the outer periphery of said insert means.

4. The locking device of claim 1, wherein said receiving means includes two cavities, each of said cavities constructed to receive an associated one of said enlarged end portions, one of said cavities nonremovably and rotatably receiving an end portion when said insert means is removed from said opening.

5. The locking device of claim 2, wherein said insert means includes an outer rim disposed adjacent to one end thereof having an outer periphery dimensioned greater than the outer periphery of the remainder of said insert means, said rim limiting the extent to which said insert means may be received within said opening.

6. A locking device for securing a vehicle to an object comprising:
    an elongate cable having enlarged end portions; and
    insert means adapted to be detachably mounted in an opening leading to a chamber on the vehicle, said insert means including at least one cavity disposed thereon for receiving at least one of said end portions, said insert means also including groove means for holding a cable portion adjacent said one end portion and an outer rim having a periphery dimensioned greater than the outer periphery of the remainder of said insert means;
    said insert means further including locking means for selectively locking said insert means in said opening, said locking means including extendable and retractable pin means;
    said rim limiting the extent to which said insert means may be received within said opening, said cavity and groove means permitting said one of said end portions to be separable from said insert means when said insert means is removed from said opening.

* * * * *